United States Patent [19]
Tanaka et al.

[11] Patent Number: 4,785,368
[45] Date of Patent: Nov. 15, 1988

[54] DEVICE FOR SELECTING A SURFACE OF A DISC IN A CARTRIDGE

[75] Inventors: Kimio Tanaka; Haruo Shiba, both of Nagano, Japan

[73] Assignee: TDK Corporation, Japan

[21] Appl. No.: 942,496

[22] Filed: Dec. 16, 1986

[30] Foreign Application Priority Data

Dec. 18, 1985 [JP] Japan ............ 60-0194559[U]

[51] Int. Cl.⁴ .................................... G11B 23/03
[52] U.S. Cl. ........................................ 360/133
[58] Field of Search .................. 360/133; 369/291

[56] References Cited
U.S. PATENT DOCUMENTS 4,536,812  8/1985  Oismi et al. .................. 360/133
4,685,017  8/1987  Swinburne et al. .......... 360/133

FOREIGN PATENT DOCUMENTS 0137965  4/1985  European Pat. Off. ........... 360/133

Primary Examiner—Robert S. Tupper
Attorney, Agent, or Firm—Steinberg & Raskin

[57] ABSTRACT

A disc cartridge capable of effectively preventing misoperation. The disc cartridge includes a write enable plug, a display section for indicating operation of the plug and a detection hole which are provided at each of upper and lower cover plates constituting a casing. The display section and detection hole of the upper cover plate are arranged opposite to the detection hole and display section of the lower cover plate respectively, and the write enable plug is arranged slidable with respect to the detection hole. Also, the disc cartridge includes a slide button for slidably actuating each of the write enable plugs, which is arranged so as to be operated from outside said casing.

19 Claims, 6 Drawing Sheets

DEVICE FOR SELECTING A SURFACE OF A DISC IN A CARTRIDGE

BACKGROUND OF THE INVENTION

1. Field of the Invention

This invention relates to a disc cartridge, and more particularly to a disc cartridge which has a hard disc, particularly, a double-sided type hard disc housed in a casing.

2. Background of the Invention

In general, a disc-type data recording carrier such as a compact disc (CD), a video disc (LD) or the like is used in a manner to be removed from a packing case and set in a recording and/or reproducing equipment.

Conventionally, it has been desirable to protect such a disc type recording carrier from the environment because it is not only readily covered with dust and damaged but adversely affected due to a variation in temperature. For this purpose, the use of an envelope such as a tray, a casing or the like has been proposed to protect the disc. Unfortunately, such a conventional envelope is not suitable for the protection of a double-sided hard disc, because the housing of the disc in a storage space defined in the envelope causes the disc to be contacted with the envelope. Also, the envelope fails to prevent an error in selection of a surface of a disc to be used when it is to be charged in a disc player and fails to cause the propriety of writing to a disc to be readily judged. Further, the envelope cartridge leads to misoperation of a disc cartridge because a display section for indicating a surface being used is arranged on an opposite side from a section for operating a write enable plug.

Further, the conventional envelope causes a disc to be contacted by with an inner surface thereof during the storage or transportation. Thus, the use of the envelope results in misoperation of a disc cartridge as well as damage and/or pollution of the disc and the exposure of the disc to a variation in temperature.

Accordingly, it would be highly desirable to provide a disc cartridge which is capable of effectively preventing an error in selection of a surface of a disc to be used, to thereby ensure correct operation of the disc cartridge.

SUMMARY OF THE INVENTION

Briefly speaking, in accordance with the present invention, a disc cartridge is provided. The disc cartridge includes a casing comprising an upper cover plate and a lower cover plate joined together to define a space therein, in which a disc is rotatably housed. Also, the disc cartridge includes a shutter arranged to operate at least a window provided at the casing to insert a disc driving mechanism therethrough into the disc cartridge. The casing is provided therein with a pair of actuators each of which is adapted to releasably lock the shutter. The disc cartridge also includes a disc receiver which is arranged in the casing and operatively connected to each of the actuators to selectively receive therein a part of a peripheral portion of the disc. The cartridge disc also includes a write enable plug, a display section for indicating the operation of the plug and a detection hole provided at each of the upper and lower cover plates. The display section and detection hole of the upper cover plate are arranged to opposite to the detection hole and display section of the lower cover plate, respectively, and the write enable plug is arranged to be slidable with respect to the detection hole. Further, the disc cartridge includes an operation means for slidably actuating the write enable plug with respect of, the detection hole, which is arranged so as to be operated from outside the casing.

Accordingly, it is an object of the present invention to provide a disc cartridge which is capable of ensuring the correct operation.

It is another object of the present invention to provide a disc cartridge which is capable of preventing an error in selection of a surface of a disc to be used.

It is a further object of the present invention to provide a disc cartridge which is capable of readily judging the propriety of writing to a disc.

It is still another object of the present invention to provide a disc cartridge which is capable of safely housing a disc in a casing without damaging the disc.

It is yet another object of the present invention to provide a disc cartridge which is capable of ensuring the safety of a recording surface of a disc housed in a casing.

It is yet a further object of the present invention to provide a disc cartridge which is accomplishing the above-noted objects with a simple structure.

Still other objects and advantages of the invention will be apparent from the specification.

The invention accordingly comprises the features of construction, combination of elements, and arrangement of parts which will be exemplified in the construction hereinafter set forth.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
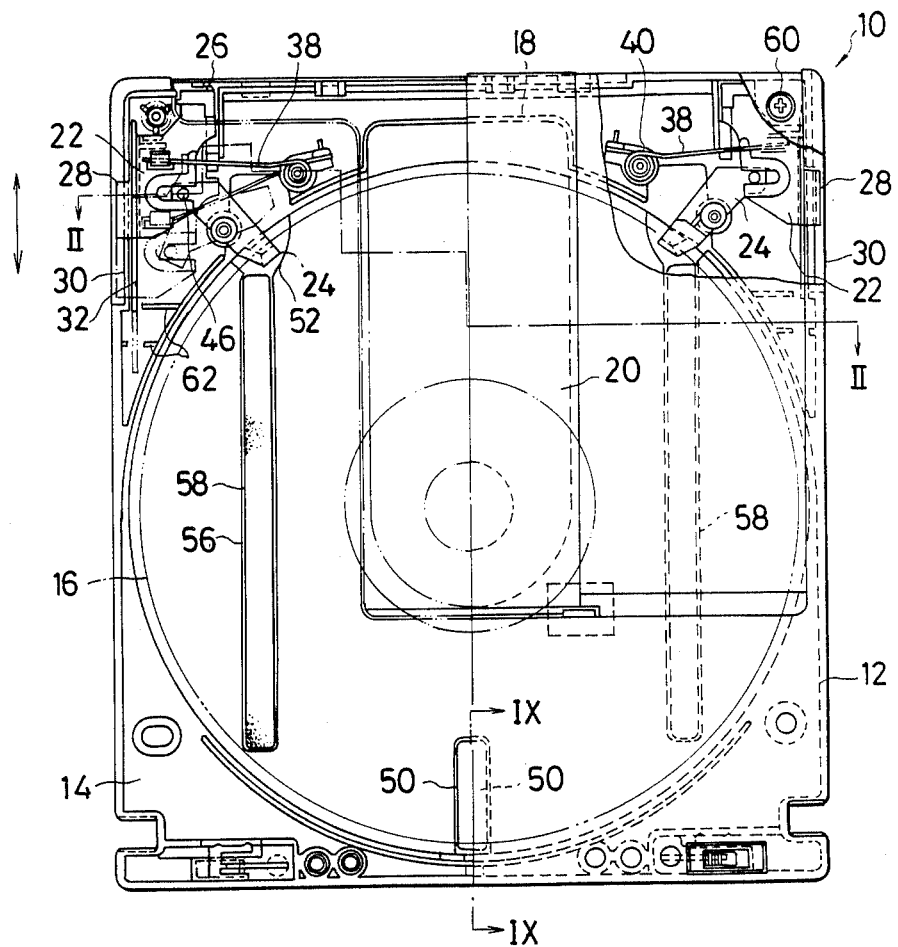
FIG. 1 is a partly cutaway plan view showing an embodiment of a disc cartridge according to the present invention.

FIG. 1 shows an embodiment of a disc cartridge according to the present invention.

Figure 2:
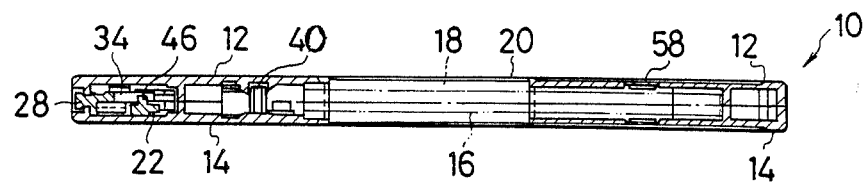
FIG. 2 is a sectional view taken along line II—II of FIG. 1.
Figure 3:
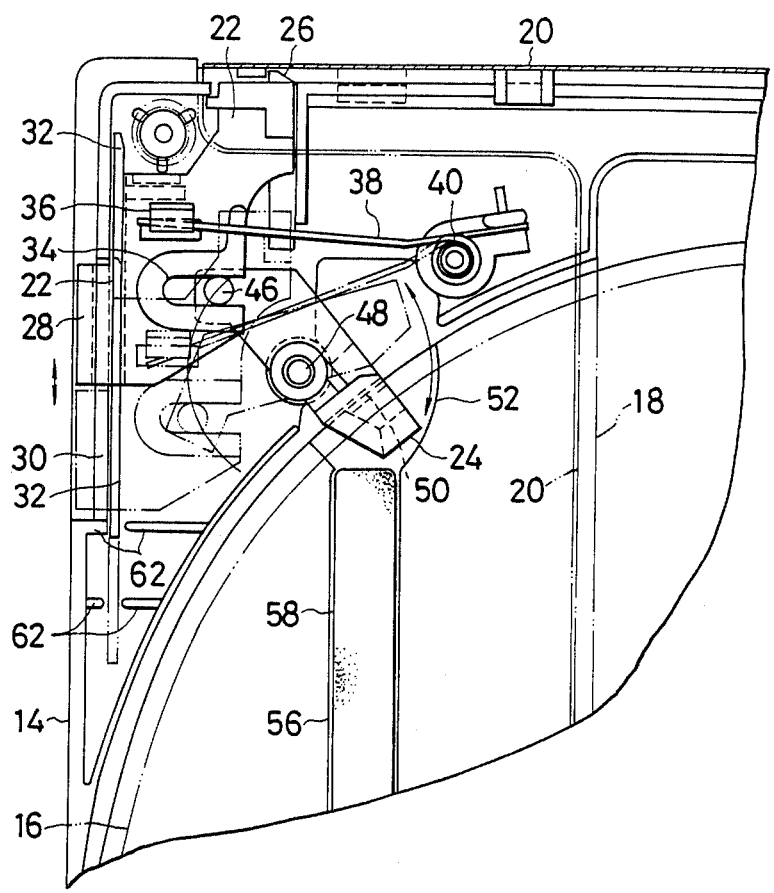
FIG. 3 is partly enlarged view showing an actuating section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the casing 10. The casing 10 is formed with at least a window 18 for inserting a disc driving mechanism of a disc player (not shown) such as a recording and/or reproducing head therethrough into the casing 10. The window 18 is operated by a shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16, as described hereinafter. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved; so that when the shutter 20 is actuated to close the window 18, the disc receiver 24 may be engaged with the disc 16 or insert therein a part of the disc to force it toward a rear end of the casing 10 while holding it at the center of the casing in a width direction of the casing, to thereby keep it at a state of floating in the space defined in the casing 10, whereas when the shutter 20 is actuated to open the window 18, the disc receiver 24 may be disengaged from the disc 16 to prepare the disc for engagement with a disc driving mechanism of a disc player which is then inserted through the opened window into the cartridge.

Figure 4:
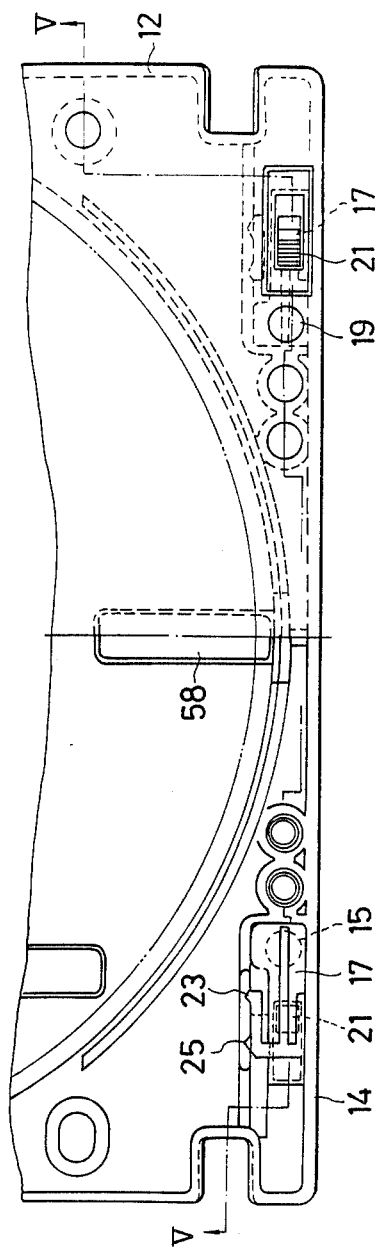
FIG. 4 is a fragmentary enlarged plan view showing a rear portion of the disc cartridge shown in FIG. 1.
Figure 5:
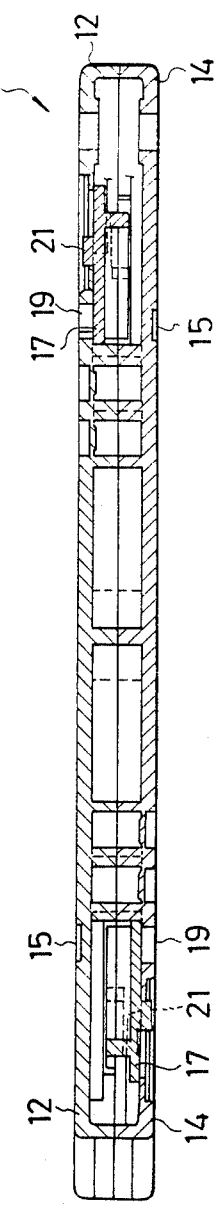
FIG. 5 is a vertical sectional view taken along line V—V of FIG. 4.
Figure 6:
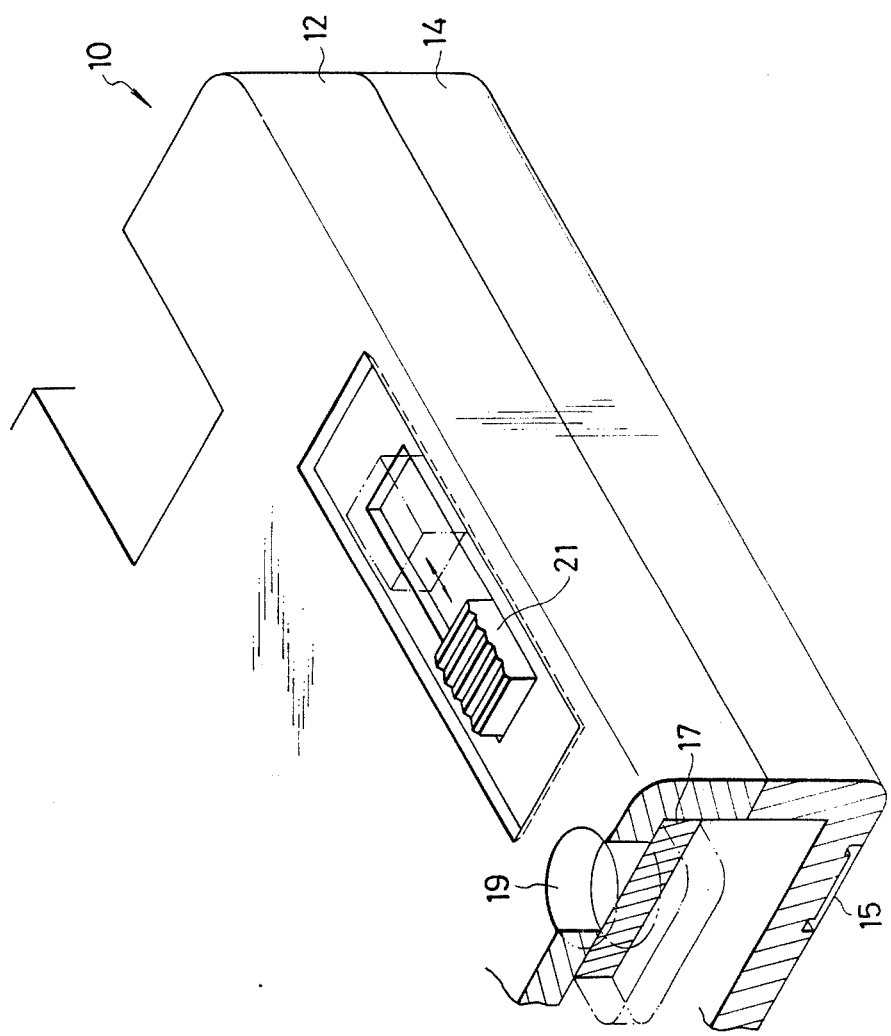
FIG. 6 is a fragmentary perspective view in section showing an essential portion of the disc cartridge shown in FIG. 1.

The disc cartridge of the illustrated embodiment, as shown in FIGS. 4 to 6, also includes a display section 15 for indicating the operation of a write enable plug 17 and a detection hole 19 which are arranged on a rear end portion of each of the upper and lower cover plates 12 and 14 in a manner to be spaced from each other in a lateral direction of the cover plate. The display section 15 and detection hole 19 of the upper cover plate 12 are arranged so as to positionally correspond to or be opposite to the detection hole 19 and display section 15 of the lower cover plate 14, as shown in FIG. 5. The write enable plug 17 is slidably provided at the cover plate so that it may be slidable with respect to the detection hole 19, to thereby open or close the detection hole 19. The actuation of the plug is carried out by means of an operation means 21 such as a slide button of which an operation section is arranged so as to be outwardly projected from the cover plate. The write enable plug 17 is provided with a position regulating means 23 which is selectively engaged with an engagement 25 of the cover plate. In the illustrated embodiment, the position regulating means 23 may comprise a projection or recess and correspondingly the engagement 25 of the cover plate may comprise a recess or projection, respectively.

In the illustrated embodiment, the shutter 20 comprises a plate member of a substantially U-shape which is movably fitted on the casing 10 so as to be slidable along the upper and lower cover plates 12 and 14.

A pair of the actuators 22, as shown in FIG. 1, are formed so as to be symmetrical with each other and arranged adjacent to both sides of a front portion of the casing 10 in a manner to be not only opposite to each other but symmetrical along a longitudinal axis of the cartridge and slidable with respect to the casing 10. Also, the actuators each serves as an actuating lever to actuate operation sections of the disc cartridge. More particularly, each of the actuators 22, as shown in FIG. 3, is provided at a front end thereof with a lock means 26, which comprise, in the illustrated embodiment, a hook-like member integrally formed at the front end of the actuator 22 and securely engaged with the shutter 20. The actuator 20 is also provided on one side or an outer side thereof with actuating means 28 which comprises, in the illustrated embodiment, a projection integrally formed on the outer side of the actuator and outwardly projecting through a horizontally extending cutout or slot 30 formed at a side wall of the casing 10. Also, the actuator 22 has cover means 32 integrally provided on the one side thereof so as to extend in a longitudinal direction thereof. The cover means 32 are formed to thoroughly and sealedly cover the slot 30 irrespective of any sliding movement of the actuator 22 to function as a dust protective cover for preventing foreign matter such dust or the like from entering the casing 10 through the cutout 30. In addition, the actuator 22 is formed on the other side or an inner side thereof with a guide groove 34 of a substantially sideways U-shape which serves as a movement transmission means for transmitting sliding movement of the actuator to the disc receiver 24 as described hereinafter. Further, the actuator 22 is provided on an upper surface thereof with a spring bearing member 36 as shown in FIG. 3 which is engaged with one end of a spring 38 held at the other end thereof on a spring holder 40 fixed on the casing 10, so that the actuator may be constantly forced toward a front end of the casing.

Figure 7:
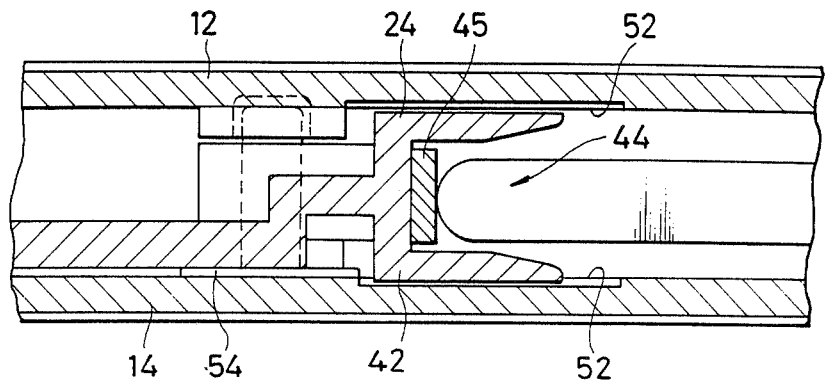
FIG. 7 is a fragmentary sectional view showing a receiver body of a disc receiver.
Figure 8:
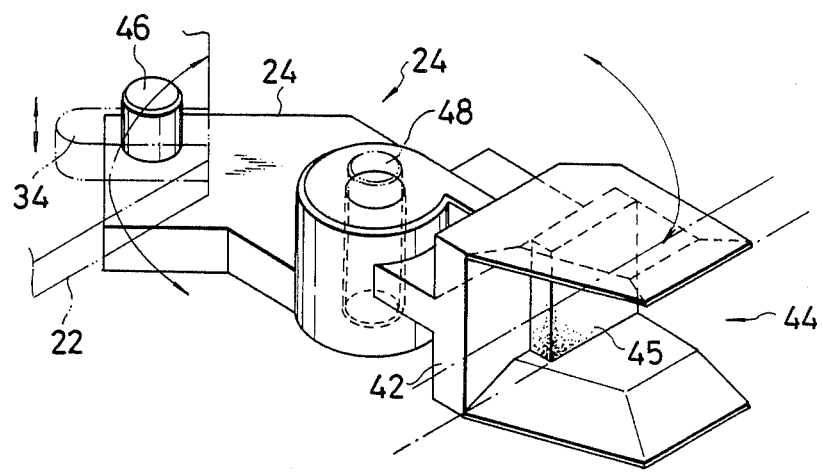
FIG. 8 is a perspective view showing a disc receiver.

A pair of the disc receivers 24, as shown in FIG. 1, are also formed in a manner to be symmetrical with each other. Each of the disc receivers 24 is generally formed into a liver-like shape as shown in FIGS. 1, 3 and 8 and provided at one end thereof with a receiver body 42. The receiver body 42 is formed into a substantially sideways U-shape to define therein a recess designated at reference numeral 44 in FIG. 7. The recess 44 is provided on an end surface thereof contacting with a peripheral end portion of the disc 16 with an elastic member 45 to prevent unsteadiness and/or damage of the disc 16 in the disc receiver 24. The elastic member 45 may be formed of rubber or a soft plastic material such as polyethylene, polypropylene or vinyl chloride. Such an elastic member may be arranged on upper and lower surfaces of the recess 44 of the receiver body 42. The recess 44 of the receiver body 42, as shown in FIG. 7, is preferably formed in a manner such that an opened end portion or inlet portion thereof is vertically enlarged so as to facilitate the insertion and removal of a disc 16 with respect to the recess 44.

The so-formed receiver body 42 is positioned adjacent to a peripheral portion of the disc 16 to selectively receive a part of the peripheral portion in the recess 44 depending upon the sliding movement of the actuator as indicated at solid lines and two-dot chain lines in FIGS. 1 and 3 and also act as an elevator for lifting the disc 16. More particularly, the disc receiver 24 is also provided at the other end thereof with a guide pin 46 acting as an operative connection means, which is loosely fitted in the guide groove 34 of the actuator 22 to operatively connect the disc receiver 24 to the actuator 22. The disc receiver 24 is movably supported at a middle portion thereof on a pivot pin 48 so as to be rotatable about the pin 48 and vertically movable along the pin 48.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchedly arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 9:
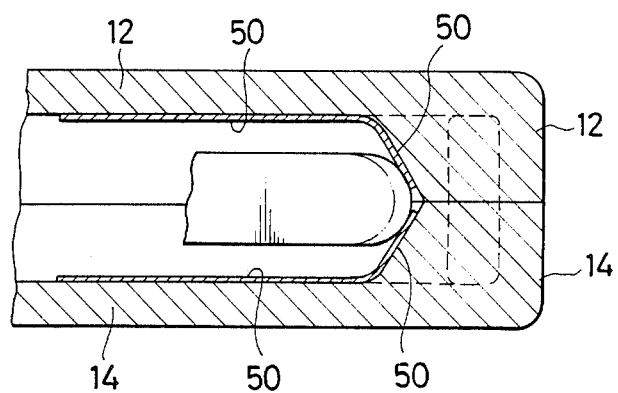
FIG. 9 is a sectional view taken along line IX—IX of FIG. 1.

Further, in the illustrated embodiment, the casing 10 is formed at a rear end thereof into a substantially sideways V-shape as shown in FIG. 9, so that the rear end may be tapered. Such construction facilitates the positioning of the disc 16 at the center of the casing 10 in a width direction of the casing because the positioning is carried out while the disc 16 is being guided along the tapered rear end. This results in the disc 16 being located at positions indicated at two-dot chain lines and solid lines in FIG. 9 when the disc cartridge is charged in a disc player and removed therefrom, respectively. Also, the casing 10 may have a disc holding material 50 applied to the tapered rear end thereof to ensure the safety and smooth operation of the disc in the casing 10. For this purpose, the disc holding material 50 is preferably a material which is capable of exhibiting lubricating properties, such as ultra-high-molecular-weight polyethylene, ultra-high-molecular-weight polyethylene foam, PET, metal sheet such as stainless steel or the like. Such a material likewise may be applied to portions of the casing 10 adjacent to the tapered rear end as shown in FIG. 9.

The casing 10 is formed on each of upper and lower surface sections of an inner surface thereof with a pair of recesses 52 so as to positionally correspond to the disc receivers 24, as shown in FIG. 1. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate bolts and ribs, respectively.

Now, the manner of operation of the disc cartridge of the illustrated embodiment constructed as described above will be described hereinafter with reference to FIGS. 1 to 9.

Prior to the insertion of the disc cartridge in a disc player (not shown) for the operation, the display section 15 provided on a surface of the disc cartridge to be operated is first confirmed and then the operation means 21 on the opposite surface are actuated to select one of opening and closing of the detecting hole 19. This results in a surface of the disc cartridge to be used and the indication of operation of the operation means 21 being confirmed. Also, this permits the misoperation of the disc cartridge after the insertion to be effectively detected through the detection hole 19. Upon completion of the writing, the operation means 21 are actuated to close the detection hole 19 with the plug 17. Thus, the writing may be carried out only when the detection hole is opened.

When the disc cartridge is inserted into a disc player, the actuating means or projection 28 of the actuator 22 projecting through the cutout or slot 30 of each of the side walls of the casing 10 is engaged with a projection provided at an insertion port of the disc player to be rearwardly slided along the slot 30 against the spring 38 and the cover means 32 sealedly cover the slot 30 of the casing 10. The sliding of hhe projection 28 causes the shutter 20 to be released from the lock means or hook-like member 26, so that the shutter 20 may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 from the recess 44, resulting in the disc 16 being safely supported on the lubricating sticked sheets 58 and then operatively engaged with a disc driving mechanism of the disc player.

When the disc cartridge is to be removed from the disc player, the disc 16 is first disengaged from the disc driving mechanism of the disc player to be put on the lubricating sticked sheets 58 and then the shutter 20 is moved by means of the shutter actuating mechanism of the disc player to close the window 18. Then, the disc cartridge is removed from the disc player, so that the actuator 22 may be slided toward the front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the the space defined in the casing 10. Simultaneously, the lock means 26 of the actuator 22 actuate to keep the shutter 20 closed.

As can be seen from the foregoing, the present invention is constructed in the manner that the upper cover plate is provided at the rear portion thereof with the display section and detection hole in a manner to be spaced from each other and opposite to the detection hole and display section provided on the lower cover plate, respectively. Also, the write enable plug is slidable with respect to the detection hole by the operation means. Thus, the present invention effectively prevent an error in selection of a surface of the disc to be used and misoperation of the plug, to cause the operation of the disc cartridge to be readily accomplished. In particular, the confirmation is readily carried out depending upon the position of the write enable plug. Accordingly, it will be noted that the present invention ensures the safe operation of the disc cartridge. also, the shutter is firmly locked by the actuator when it is actuated to close the window, to thereby be prevented from being opened when it is not used. This effectively prevents dust or the like from entering the disc cartridge through the window.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A disc cartridge comprising:
    a casing comprising an upper cover plate and a lower cover plate joined together to define a space therein;
    a disc rotatably housed in said space of said casing;
    at least one window provided in said casing;
    a shutter for operating said at least one window to permit insertion of a disc drive mechanism of a disc player therethrough into said disc cartridge;

an actuator slidably arranged in said casing and engaged with said shutter to releasably lock said shutter;

a disc receiver operatively connected to said actuator and selectively receiving therein a part of a peripheral portion of said disc, said disc receiver being arranged in said casing to release or receive said disc when moved by said actuator;

a write enable plug, a display section for indicating the operation of said plug and a detection hole provided at each of said upper and lower cover plates;

said display section and detection hole of said upper cover plate being arranged opposite to said detection hole and display section of said lower cover plate, and said write enable plug being arranged so as to be slidable with respect to said detection hole to thereby open or close said detection hole; and operation means for slidably actuating said write enable plug, said operation means being arranged so as to be operated from outside said casing.

2. A disc cartridge as defined in claim 1, wherein each said write enable plug is slidably fitted in said respective cover plate.

3. A disc cartridge as defined in claim 2, wherein said operation means are arranged on said respective cover plate provided with said detection hole.

4. A disc cartridge as defined in claim 1, wherein said write enable plug is provided with position regulating means and said respective cover plate is provided with an engagement means selectively engaged with said position regulating means.

5. A disc cartridge as defined in claim 4, wherein said position regulating means comprise a recess and said engagement means comprise a projection.

6. A disc cartridge as deined in claim 4, wherein said position regulating means comprise a projection and said engagement means comprise a recess.

7. The cartridge of claim 1, wherein said display section and detection hole on each said plate are spaced fron one another in a lateral direction of said casing.

8. The cartridge of claim 1, wherein each said plug and operation means are situated adjacent said detection hole of said respective plate and opposite said display section of said other plate.

9. The cartridge of claim 1, wherein said operation means comprise a slide button having an operation section arranged to outwardly project from said respective cover plate.

10. The cartridge of claim 1, additionally comprising two said actuators slidably arranged in said casing, each said actuator being provided with lock means for locking said shutter when said cassette is not in use, a projection on an outer side thereof and projecting through a cutout or slot formed in an adjacent side wall of said casing, and cover means situated thereon for sliding movement therewith, for covering said cutout or slot irrespective of any sliding movement of said respective actuator, whereby contaminants are prevented from entering said casing through said slot, and two said disc receivers, each being operatively connected to a respective actuator.

11. The cartridge of claim 10, wherein said locking means comprise a hook-like member integrally formed at a front end of said respective actuator.

12. The cartridge of claim 10, wherein each said disc receiver comprises a receiver body provided at one end thereof for receiving the disc peripheral portion, operative connection means at an opposite end thereof for operatively engaging said respective actuator, and a pivot pin mounted said casing and pivotably supporting said disc receiver at a middle portion thereof between said ends, and each said actuator comprises transmitting means for transmitting sliding movement of said actuator into pivotal movement of said respective disc receiver.

13. The cartridge of claim 12, wherein each said disc receiver body additionally comprises a substantially U-shaped recess for receiving the peripheral disc portion.

14. The cartridge of claim 12, wherein said operative connection means comprise a pin on said end of said receiver and said transmitting means comprise a groove on said actuator with said respective pin of said disc receiver engaging said actuator in said groove.

15. The cartridge of claim 12, wherein said operative connection means comprise a groove on said receiver end, and said transmitting means comprise a pin on said actuator engaging said respective disc receiver in said groove.

16. The cartridge of claim 10, additionally comprising a spring bearing member situated on each said actuator, two spring holders, each affixed on said casing, and two springs, each engaged at one end thereof with a respective spring bearing member and at an opposite end thereof with a respective spring holder, for biasing each said actuator towards a front end of said casing.

17. The cartridge of claim 10, wherein a side of said cartridge space opposite said shutter and window is formed into a substantially V-shaped recess, to facilitate positioning of said disc within said space.

18. The cartridge of claim 1, wherein, when said write enable plug is positioned to uncover said detection hole, writing can be carried out on a respective surface of said disc.

19. The cartridge of claim 1, wherein said respective display sections and detection holes are provided at rear portions of said cover plates.

* * * * *